United States Patent [19]
Smith et al.

[11] Patent Number: 5,847,922
[45] Date of Patent: *Dec. 8, 1998

[54] PORTABLE COMPUTER DOCKING STATION HAVING IMPROVED SPEAKER APPARATUS THEREIN

[75] Inventors: Kelly K. Smith; Mitchell A. Markow, both of Spring; David E. Gough, Houston, all of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 681,705

[22] Filed: Jul. 29, 1996

[51] Int. Cl.$^6$ .................................. G06F 1/16; H04R 1/02
[52] U.S. Cl. ........................... 361/685; 361/686; 381/388
[58] Field of Search ...................... 361/680, 681, 361/682, 683, 686; 381/87, 88, 90, 159, 160, 188, 24, 309, 388; 364/708.1; 248/917, 918; G06F 1/16

[56] References Cited

U.S. PATENT DOCUMENTS

| | | | |
|---|---|---|---|
| 4,976,586 | 12/1990 | Lazzeroni et al. | 181/129 |
| 5,400,408 | 3/1995 | Lundgren et al. | 381/88 |
| 5,504,820 | 4/1996 | Koizumi | 381/24 |
| 5,557,562 | 9/1996 | Yoshiharu et al. | 364/708.1 |
| 5,604,663 | 2/1997 | Shin et al. | 361/686 |
| 5,610,992 | 3/1997 | Hickman | 381/188 |
| 5,627,901 | 5/1997 | Josephson et al. | 381/155 |
| 5,633,943 | 5/1997 | Daniels et al. | 381/188 |

FOREIGN PATENT DOCUMENTS

| | | | |
|---|---|---|---|
| 55-73197 | 6/1980 | Japan | 381/24 |
| 2-27400 | 11/1990 | Japan | 381/24 |

*Primary Examiner*—Lynn D. Feild
*Attorney, Agent, or Firm*—Konneker & Smith, P.C.

[57] ABSTRACT

A portable computer docking station has a molded plastic housing within the interior of which are a ported speaker structure operative at low, mid and high frequencies, and a nonported speaker structure operative only at mid-to-high frequencies. The ported speaker structure has a ported enclosure section formed integrally with an exterior wall portion of the housing and having an open side. A first speaker is mounted on a lid member at an opening therein, with the lid member being secured to the ported enclosure section over the open side thereof with a seal member being sandwiched between the lid member and the enclosure section, and a sound absorbing structure being disposed within the enclosure section under the first speaker. The nonported speaker structure includes a second speaker supported on a second wall portion of the housing. A mid-range enclosure, formed from an open cell foam material, engages a section of the second wall portion that circumscribes the second speaker and has a chamber therein that receives the second speaker. The input of the first speaker is connected to the output of a first amplifier having an input in turn connected to a first equalizing circuit. The input of the second speaker is connected to the output of a second amplifier, having a wattage capacity less than that of the first amplifier. A second equalizing circuit is connected to the input of the second amplifier.

9 Claims, 4 Drawing Sheets

PORTABLE COMPUTER DOCKING STATION HAVING IMPROVED SPEAKER APPARATUS THEREIN

BACKGROUND OF THE INVENTION

1. Field of the Invention

The present invention generally relates to speaker apparatus used in computer devices to provide them with sound capabilities and, in a preferred embodiment thereof, more particularly relates to a specially designed speaker system representatively incorporated in a portable computer docking station.

2. Description of Related Art

With the growing popularity of sound-based multimedia systems, an increasing number of computers and computer peripheral devices are being provided with speakers to accommodate the multimedia systems' sound requirements. The incorporation of sound into a computer device brings two often conflicting design criteria into play—namely, (1) the desire to provide the device with high quality sound output sufficient to satisfy the increasingly sophisticated user of multimedia systems, and (2) the requirement to maintain the overall cost of the device as low as possible due to the highly competitive nature of the computer industry.

While there are a variety of conventional speaker structures available that are capable of providing high quality sound outputs in various noncomputer applications, their relatively high cost renders them unsuitable for computer applications. On the other hand, there are also many relatively inexpensive speaker structures that might meet the low cost criteria of computer applications, but provide only mediocre sound output quality.

From the foregoing it can thus be seen that a need exists in various computer devices for improved speaker apparatus and associated methods of incorporating such speaker apparatus into the devices. It is accordingly an object of the present invention to provide such improved speaker apparatus and associated methods.

SUMMARY OF THE INVENTION

In carrying out principles of the present invention, in accordance with a preferred embodiment thereof, a computer device, representatively a portable computer docking station, has a housing having a wall portion, and a ported speaker structure carried by the housing, a portion of the ported speaker structure being formed integrally with the wall portion. Preferably, the housing is of a molded plastic construction, and a ported enclosure section of the ported speaker structure is molded integrally with an exterior wall portion of the housing and disposed in the interior of the housing.

In a preferred embodiment thereof, the ported speaker structure is a single flared port bass reflex speaker, operative at low, mid and high frequencies, and an open-topped ported enclosure section of the speaker is molded integrally with the exterior housing wall portion. The ported speaker structure also includes a resilient foam sound attenuating member disposed in the interior of the enclosure section, a lid member upon the underside of which a speaker is carried, and a resilient sealing member. The lid member is secured to the open top side of the enclosure section with the sealing member being sandwiched and compressed between the lid member and the open enclosure section side to seal it off.

According to another aspect of the invention the ported speaker structure forms a portion of an asymmetric speaker system that is incorporated in the docking station and provides the desirable dual attributes of improved sound output quality and reduced fabricational costs compared to typical computer device speaker systems of conventional constructions.

In addition to the ported speaker structure described above, the asymmetric speaker system includes a nonported speaker structure operative only at mid-to-high frequencies and having a second speaker supported on a housing wall at an opening therein. A mid-range enclosure formed from a porous material, preferably an open cell foam material, is secured to an inner side of the housing wall on a section thereof that circumscribes the second speaker, the enclosure having a chamber therein that received the second speaker.

The input of the ported speaker structure is coupled to the output of a first amplifier having an input coupled in turn to a first equalizing circuit. The input of the nonported speaker structure is coupled to the output of a second amplifier having an input coupled in turn to a second equalizing circuit. Because of the operating range differential between the ported and nonported speaker structures, the second amplifier may be less expensive, and of a lower wattage than the first amplifier.

In addition to this cost savings, further fabricational cost savings are achieved by the integral formation of a portion of the ported speaker structure with the docking station housing, and the use of an inexpensive foam material to form the mid-range enclosure associated with the nonported speaker structure.

DETAILED DESCRIPTION

Figure 1:
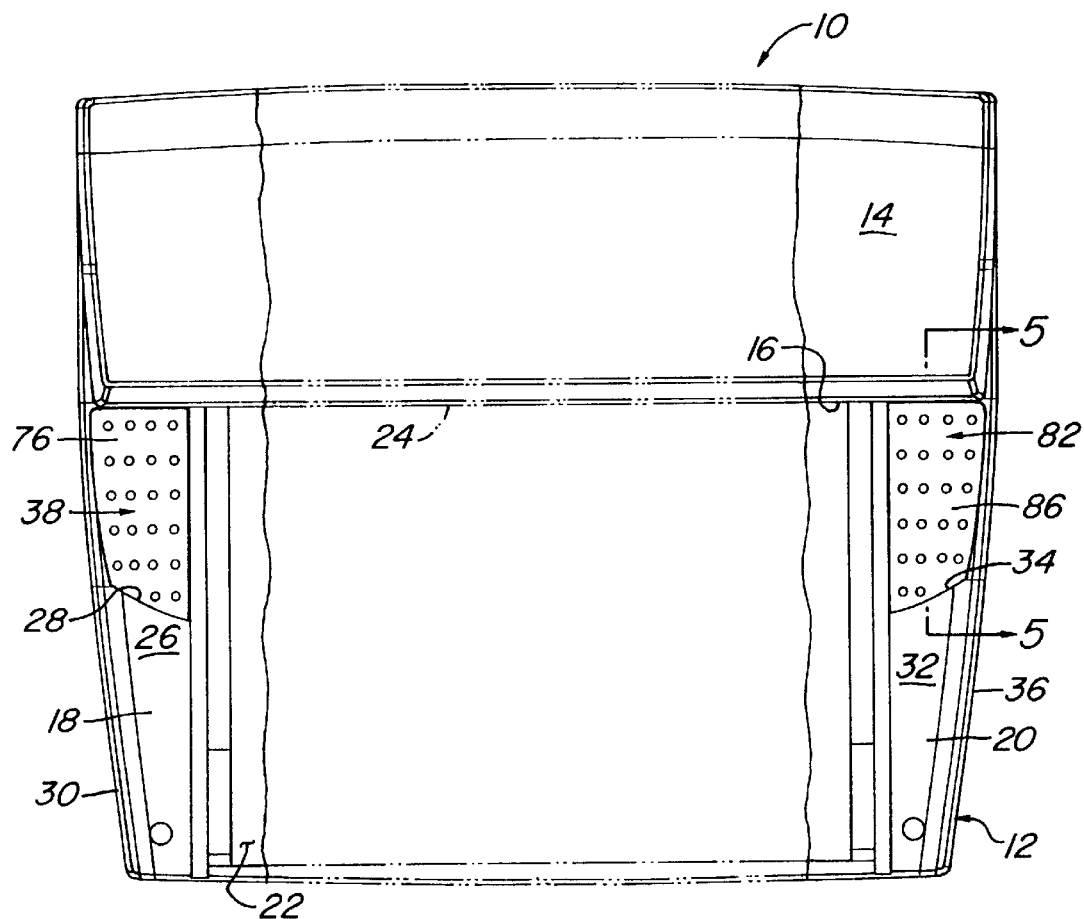
FIG. 1 is a partially phantomed top plan view of a representative portable computer docking station having incorporated therein improved speaker apparatus embodying principles of the present invention.

Illustrated in simplified, partially phantomed form in FIG. 1 is a computer device, representatively a portable computer docking station 10, that incorporates therein subsequently described speaker apparatus that embodies principles of the present invention. The docking station 10 includes a generally rectangular molded plastic housing 12 having a rear side portion 14 with a vertical front side wall 16, and left and right side portions 18 and 20 extending forwardly from the rear side portion 14 on opposite sides of a top side recess area 22 also extending forwardly from the rear side portion 14. Additionally, the housing 12 has a bottom side wall 23 (see FIG. 2).

Docking station 10 serves as an interface between a portable notebook computer (not shown) and desktop computer peripheral devices, such as a monitor, mouse, keyboard, and printer (also not shown). To use the docking station 10, the portable computer is placed in the top side recess area 22 and moved rearwardly along its bottom side until a connector on the rear side of the computer is mated with an associated connector structure 24 on the housing wall 16. This operatively couples the electronics within the now docked computer to the aforementioned desktop computer peripheral devices.

The left side portion 18 of the housing 12 has a top side wall 26 with an opening 28 therein, and is bounded on its left side by an exterior left side wall 30 of the housing 12. The right side portion 20 of the housing 12 has a top side wall 32 with an opening 34 therein, and is bounded on its right side by an exterior right side wall 36 of the housing 12.

Figure 2:
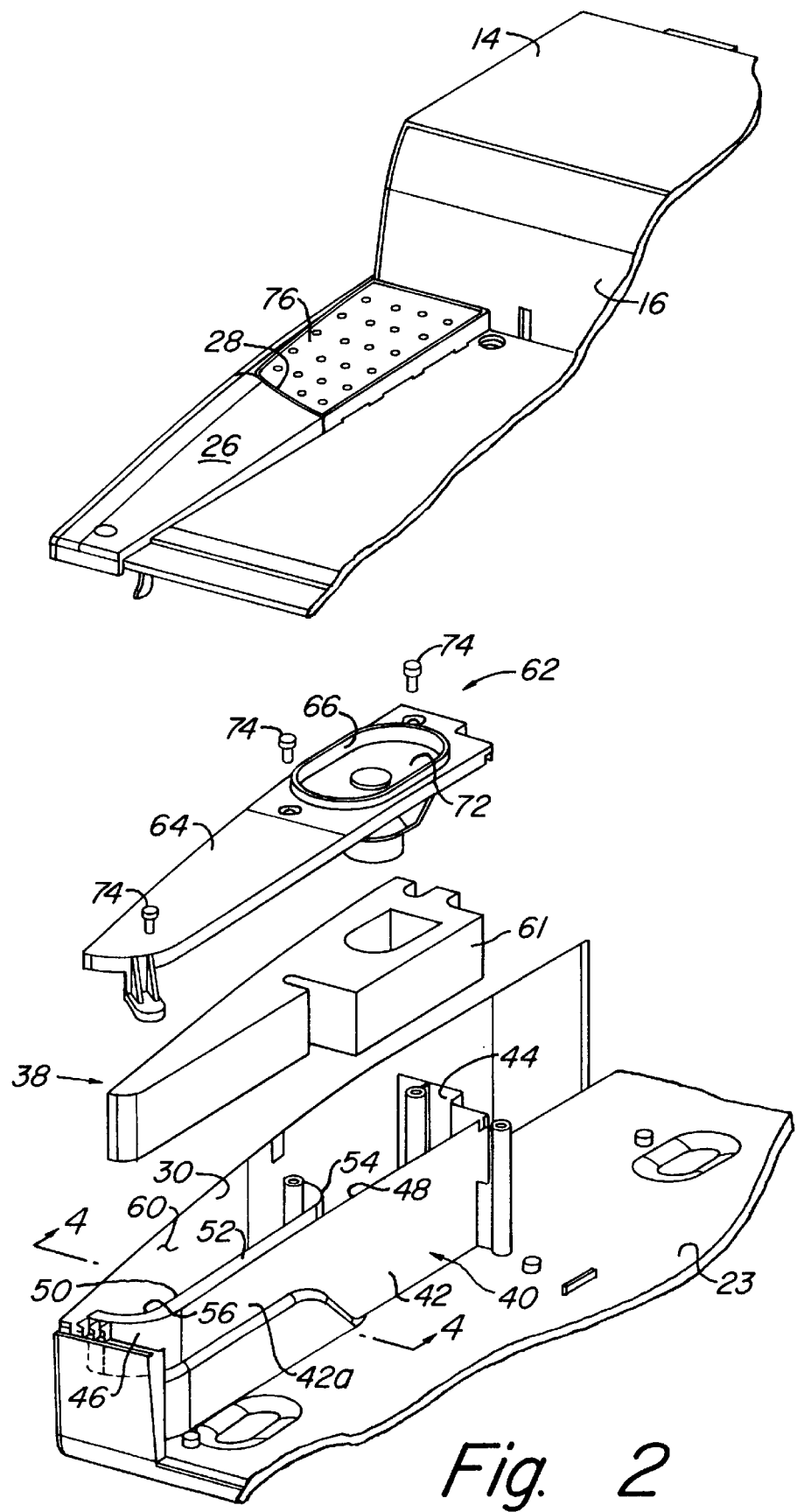
FIG. 2 is a reduced scale partially exploded perspective view of a left side portion of the docking station of FIG. 1.

Operatively disposed within the left side portion 18 of the housing 12 is a specially designed ported speaker structure 38 which embodies principles of the present invention and is illustrated in partially exploded perspective form in FIG. 2. Ported speaker structure 38 is operative at low, mid and high frequencies. According to a key feature of the present invention, the ported speaker structure 38 includes a hollow ported enclosure section 40 molded integrally with and projecting upwardly from the bottom housing wall 23 within the interior of the housing 12.

Figure 4:
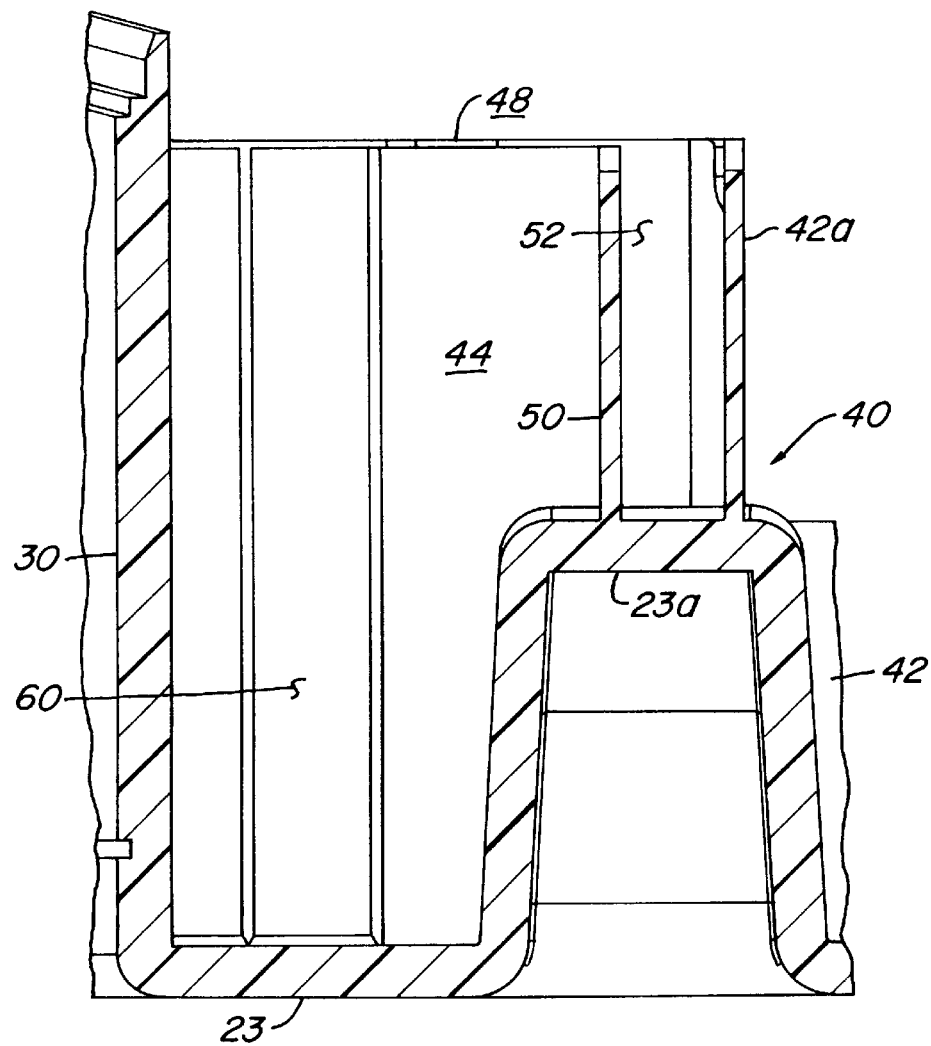
FIG. 4 is an enlarged scale cross-sectional view through a portion of a ported enclosure section of a speaker structure taken along line 4—4 of FIG. 2, the enclosure section portion being formed integrally with a wall of the docking station housing.

Ported enclosure section 40 (see FIGS. 2 and 4) has an upstanding right side wall 42 (which, as illustrated in FIG. 2, forms an outer wall of the enclosure section (40), an upstanding left wall defined by a portion of the left exterior wall 30 of the housing 12, a rear end wall 44, a front end wall 46, and an open top side 48. As best illustrated in FIG. 4, a portion 23a of the bottom housing wall 23 is raised relative to the balance of wall 23. Raised wall portion 23a forms with an upper portion 42a of the right side wall 42 and a curved interior enclosure section side wall 50 a speaker enclosure port passage 52 having a flared inlet end 54, and a curved outlet end 56 that opens outwardly through a port opening 58 formed in the left housing side wall 30. A relatively thick section 61 of noise-absorbing foam material 61 is complementarily received within a lower side portion of the interior 60 of the ported enclosure section 40, with the top side of the foam material section 61 being vertically adjacent the bottom side of the port passage 52.

Figure 3:
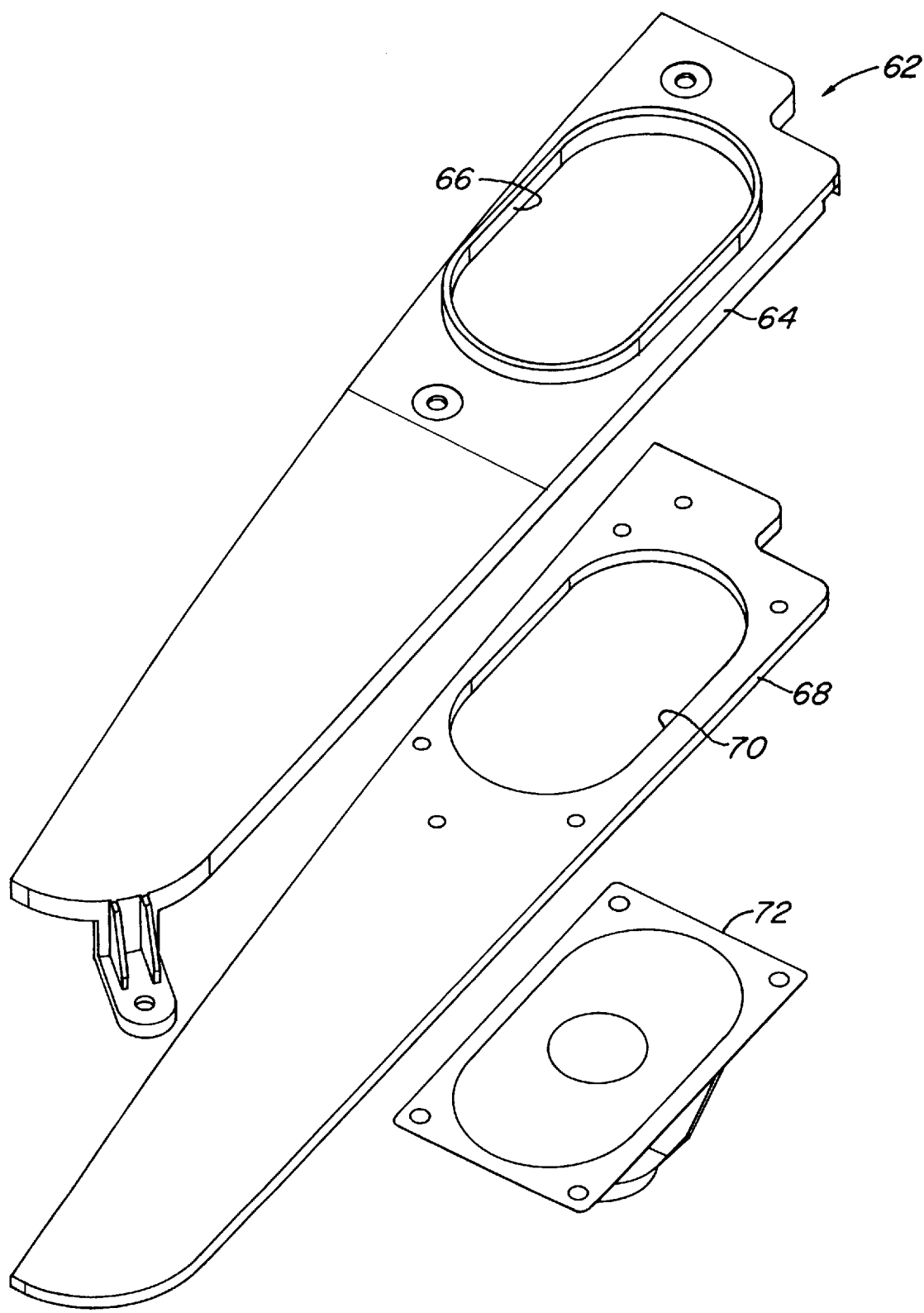
FIG. 3 is an enlarged scale exploded perspective view of a ported speaker subassembly shown in FIG. 2.

Extending across and covering the open top side 48 of the ported enclosure section 40 formed integrally with the housing 12 is a speaker subassembly 62 which is also shown in exploded perspective form in FIG. 3. Speaker subassembly includes, from top to bottom as viewed in FIG. 3, an elongated flat lid member 64 having an opening 66 formed through one end thereof, a sheet of closed cell foam sealing material 68 with an opening 70 formed therein and a shape complementary to that of the lid member 64, and a speaker 72.

Speaker 72 is suitably supported on the underside of the lid member 64, beneath its opening 66, and projects downwardly through the sealing sheet opening 70. The lid member 64 is secured over the open side 48 of the enclosure section 40, with screws 74, and underlies the top side wall 26 of the left housing side portion 18 with the speaker 72 underlying the housing opening 28 which is covered with a suitable perforated speaker grille member 76 positioned within the housing wall opening 28. Sealing sheet 68 is sandwiched and compressed between the lid member 64 and the open top side 48 of the integrally formed ported enclosure section 40 to sealingly close the top side 48 of the enclosure section 40.

Figure 6:
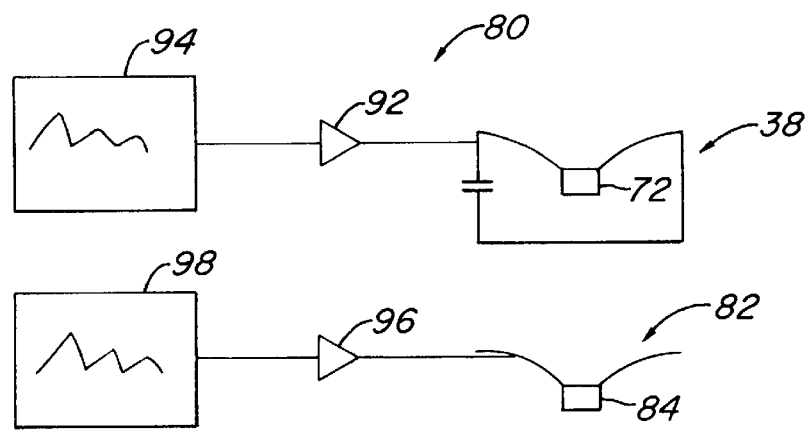
FIG. 6 is a schematic circuit diagram of the ported and nonported speaker portions of the docking station.
Figure 5:
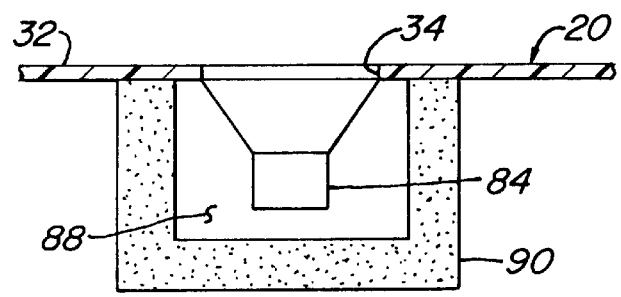
FIG. 5 is a highly schematic cross-section through a nonported speaker structure portion of the docking station taken along line 5—5 of FIG. 1.

Referring now to FIGS. 1, 5 and 6, the previously described ported speaker structure 38 forms a part of an asymmetric speaker system 80 (schematically depicted in circuit diagram form in FIG. 6) incorporated in the docking station 10 and further including a nonported speaker structure 82 operative only at mid-to-high frequencies. Speaker structure 82 includes a speaker 84 operatively supported on the underside of the housing top side wall section 32 beneath a perforated speaker grille 86 disposed in the wall opening 34. According to another feature of the present invention, as schematically illustrated in FIG. 5 the speaker 84 is downwardly received in a chamber portion 88 of a mid-range enclosure 90 secured to the underside of the housing wall 32 around the wall opening 34. Enclosure 90 is formed from a porous material, representatively an open cell foam material.

As illustrated in the FIG. 6 schematic circuit diagram, the input of the ported speaker structure 38 is connected to the output of a first amplifier 92 whose input is operatively coupled to a first equalizing circuit 94. The input of the nonported speaker structure 82 is connected to the output of a second amplifier 96 whose input is operatively coupled to a second equalizing circuit 98. Because the second amplifier 96 is associated with the nonported speaker structure 82, while the first amplifier 92 is associated with the ported speaker structure 38 with its additional bass range capabilities, the amplifier 96 may be of a smaller wattage capability than the amplifier 92. Representatively, the amplifier 92 is a five watt amplifier, and the amplifier 96 is a three watt amplifier.

The asymmetric speaker system 80 incorporated in the docking station 10 may be incorporated in a variety of other types of computer devices as well to provide them with sound capabilities. System 80 provides a relatively high quality of sound output in the docking station 10 while at the same time reducing the fabrication cost attributable to providing the docking station 10 with sound capability. As described above, this desirable fabrication cost reduction is achieved via three primary features of the overall invention—namely, (1) the fabrication of a portion of the ported speaker structure 38 integrally with the docking station housing 12, (2) the use of the nonported speaker structure 82 with its inexpensive porous enclosure structure 90 that eliminates the necessity of a rigid enclosure, and (3) the corresponding ability to incorporate the lower wattage amplifier 96 associated with the nonported speaker structure 82. While the overall speaker system 80 illustrated herein incorporates all three of these features, it will be appreciated that not all of the three features need be incorporated to provide a desirable fabrication cost reduction in the docking station while at the same time providing it with an improved sound output quality level.

The foregoing detailed description is to be clearly understood as being given by way of illustration and example only, the spirit and scope of the present invention being limited solely by the appended claims.

What is claimed is:

1. A portable computer docking station comprising:

a housing having a wall portion; and a ported speaker structure carried by said housing, a portion of said ported speaker structure being formed integrally with said wall portion of said housing, said ported speaker structure having a ported enclosure section, and said portion of said ported speaker structure being a portion of said ported enclosure section, said portion of said ported enclosure section having an open side, and said ported speaker structure further including a lid member secured to and covering said open side and having an opening therein, a resilient seal member sandwiched between said lid member and said open side of said ported enclosure section, and a speaker operatively supported at said lid member opening.

2. The portable computer docking station of claim 1 wherein said ported speaker structure further including a noise absorbing member disposed within said portion of said ported enclosure section.

3. The portable computer docking station of claim 2 wherein said noise absorbing member is formed from a noise absorbing foam material.

4. The portable computer docking station of claim 1 wherein said ported speaker structure has a flared port configuration.

5. Computer apparatus comprising:

a housing having a first wall portion and a second wall portion;

a ported speaker structure having an enclosure section formed integrally with said first wall portion and having an open side, a lid member secured to and covering said open side and having an opening therein, a resilient seal member sandwiched between said lid member and said open side of said ported enclosure section, a first speaker operatively supported at said lid member opening, and a noise absorbing structure disposed in said ported enclosure section; and a nonported speaker structure including a second speaker supported adjacent said second wall portion, and an enclosure engaging a side section of said second wall portion circumscribing said second speaker, said enclosure being formed from a porous material and defining a chamber that receives said second speaker.

6. The computer apparatus of claim 5 wherein said computer apparatus is a portable computer docking station.

7. The computer apparatus of claim 5 wherein:

said ported speaker structure is operative at low, mid and high frequencies, and said nonported speaker structure is operative only at mid-to-high frequencies.

8. The computer apparatus of claim 5 wherein said porous material is an open cell foam material.

9. The computer apparatus of claim 5 wherein:

said first speaker has an input, said second speaker has an input, and said computer apparatus further comprises:

a first amplifier having an input, and an output coupled to said input of said first speaker, a first equalizer circuit coupled to said first amplifier input, a second amplifier having an input, and an output coupled to said input of said second speaker, said second amplifier having a wattage capacity smaller than that of said first amplifier, and a second equalizing circuit coupled to said second amplifier output.

* * * * *